United States Patent
Lee et al.

(10) Patent No.: US 9,331,322 B2
(45) Date of Patent: May 3, 2016

(54) VENT CAP FOR BATTERY

(71) Applicant: Unick Corporation, Busan (KR)

(72) Inventors: Chang Hoon Lee, Busan (KR); Kuk Chan Moon, Busan (KR); Chul Ho Kim, Gyeongsangnam-do (KR); Kyung Min Lee, Busan (KR)

(73) Assignee: UNICK CORPORATION, Busan (KR)

( * ) Notice: Subject to any disclaimer, the term of this patent is extended or adjusted under 35 U.S.C. 154(b) by 54 days.

(21) Appl. No.: 14/080,252

(22) Filed: Nov. 14, 2013

(65) Prior Publication Data
US 2014/0141292 A1   May 22, 2014

(30) Foreign Application Priority Data
Nov. 16, 2012  (KR) ................. 10-2012-0130323

(51) Int. Cl.
*H01M 2/12* (2006.01)
*H01M 10/12* (2006.01)

(52) U.S. Cl.
CPC .......... *H01M 2/1205* (2013.01); *H01M 2/1229* (2013.01); *H01M 10/121* (2013.01); *H01M 2/1223* (2013.01); *H01M 2/1252* (2013.01)

(58) Field of Classification Search
CPC  H01M 2/1205; H01M 2/1229; H01M 2/1294
See application file for complete search history.

(56) References Cited

U.S. PATENT DOCUMENTS 6,376,119 B1 * 4/2002 Nann et al. ...................... 429/54
6,461,758 B1 * 10/2002 Geibl et al. ..................... 429/72
6,562,517 B1 * 5/2003 Misra et al. ................... 429/225

FOREIGN PATENT DOCUMENTS

| JP | 2001-266846 A | 9/2001 |
| JP | 2003-132869 A | 5/2003 |
| KR | 10-0494360 B1 | 4/2006 |

* cited by examiner

*Primary Examiner* — Patrick Ryan
*Assistant Examiner* — Ben Lewis
(74) *Attorney, Agent, or Firm* — Kinney & Lange, P.A.

(57) ABSTRACT

The present invention relates to a storage-battery vent cap which adjusts an internal pressure of a storage battery by exhausting a gas generated inside the storage battery to the outside and blocking inflow of external air. The vent cap includes a cylindrical body installed in a vent hole of the battery and formed with an exhaust hole; a cylindrical insert coupled to the body, a partition being formed inside the insert and a coupling hole and a air vent being formed in the partition; and a valve fixed to the coupling hole and elastically deformed by an internal pressure of the battery to open the air vent. The valve has an umbrella-like shape including a valve body having a larger diameter than that of the coupling hole, a cover formed on an outer circumferential surface of the valve body, and a fixing portion downwardly protruded from the valve body.

9 Claims, 5 Drawing Sheets

VENT CAP FOR BATTERY

CROSS-REFERENCE TO RELATED APPLICATION

This application claims priority to and the benefit of Korean Patent Application No. 10-2012-0130323 filed in the Korean Intellectual Property Office on Nov. 16, 2012, the entire contents of which are incorporated herein by reference.

BACKGROUND

1. Field of the Invention

The present invention relates to a vent cap for a storage battery, and in particular, it relates to a vent cap for a storage battery (or referred to as a storage-battery vent cap), which adjusts an internal pressure of the storage battery by exhausting a gas generated inside the storage battery to the outside and blocking inflow of external air.

2. Description of the Related Art

A lead storage battery is a rechargeable battery which can be repeatedly charged and discharged by an oxidation-reduction reaction generated between sulfuric acid serving as electrolyte and two plates formed of lead and lead oxide. The lead storage battery typically includes a plurality of plates (positive plates and negative plates) which are alternatively arranged and separators for separating the adjacent plates, and sulfuric acid serving as electrolyte solution is filled in spaces other than the plates and the separators.

The lead storage battery has high reliability and stability satisfying many characteristics required as the rechargeable battery since it has developed for a long period of time. Further, the lead storage battery shows systematized high technical completeness and has been applied to various fields at a low cost.

However, since water of the electrolyte solution is decomposed deteriorating performance of the battery, the lead storage battery needs periodic water supplement, which is a troublesome job. As one of the methods for solving such a problem, a study on a technique for sealing the lead storage battery has been developed.

A valve regulated lead acid (VRLA) storage battery is one of such sealing-type lead storage batteries. The VRLA storage battery has design differences in applications of a special separator, called as an absorbent glass mat (AGM) having an absorption function of the electrolyte solution, high-compression of plates, and low resistance. The VRLA storage battery also has an operational difference in that hydrogen gas and oxygen gas generated by the water decomposition of the electrolyte solution when overcharged are reduced and returned to the inside thereof through a gas-recombination operation.

As in the VRLA storage battery, when a sealed lead storage battery is overcharged, electrolyte solution is electrolyzed so as to generate hydrogen gas and oxygen gas, thereby increasing an internal pressure of the battery. This increase of pressure caused by the generated gases not only deteriorates performance of the battery but also involves the risk of exploding a case of the battery. Accordingly, means for exhausting a gas generated inside the storage battery to the outside and blocking inflow of external air should be developed.

The above information disclosed in this Background section is only for enhancement of understanding of the background of the invention and therefore it may contain information that does not form the prior art that is already known in this country to a person of ordinary skill in the art.

SUMMARY OF THE INVENTION

An object of the present invention is to provide a storage-battery vent cap, capable of improving cycle-life of a storage battery by blocking leakage of electrolyte solution, quickly exhausting a gas, and operating a valve at an appropriate range of pressure.

Another object of the present invention is to provide a storage-battery vent cap, having a simple structure and a strong coupling strength of constituent elements, and being capable of simplifying a manufacturing process.

In accordance with an aspect of the present invention, there is provided a storage-battery vent cap includes: a cylindrical body installed in a vent hole of a storage battery and formed with an exhaust hole; a cylindrical insert coupled to the body, a partition being formed inside the insert and a coupling hole and a air vent being formed in the partition; and a valve fixed to the coupling hole and elastically deformed by an internal pressure of the storage battery to open the air vent.

The valve may have an umbrella-like shape including a valve body having a larger diameter than that of the coupling hole, a cover formed on an outer circumferential surface of the valve body, and a fixing portion downwardly protruded from the valve body. The valve body and the fixing portion may be respectively adhered to a top surface and a bottom surface of the partition to fix the valve to the insert. When an internal pressure of the storage battery is increased, the cover may be elastically deformed to open the air vent.

The coupling hole may be formed at a center of the partition, and the air vent may be formed around the coupling hole. The air vent may include a plurality of air vents radially disposed about the coupling hole, and the air vent may have a slit shape extending in a circumferential direction about the coupling hole.

The body may have a cylindrical shape having a sealed upper end, the exhaust hole may be formed on a side surface of the body, and a coupling groove is formed an outer circumference of the body.

The insert may be inserted through an open lower end of the body, a flange may be formed on a lower outer circumferential surface of the insert, and a coupling protrusion to be inserted into the coupling groove may be formed on the outer circumferential surface of the insert.

A packing may be interposed between a lower end of the body and the flange, and the packing may be compressed when the body and the insert is coupled to each other. A mounting groove into which a part of the packing is to be inserted may be formed on a top surface of the flange, and the mounting groove may have a shape of which depth gets deeper toward the inside. An installing groove may be formed at an upper end and a middle end of the body, and an O-ring is inserted into the installing groove.

In accordance with the aforementioned structure of the present aspect, the valve is elastically deformed according to the internal pressure of the storage battery to open or close the air vent. Accordingly, it is possible to prevent leakage of electrolyte solution in a normal state by using the vent cap. Further, by operating the valve according to the internal pressure of the storage battery, a gas can be exhausted to improve cycle-life of the storage battery.

Furthermore, in the present exemplary embodiment, the open bottom surface of the insert is connected to the inside of the storage battery. Accordingly, the valve can be reliably operated in an appropriate level of pressure. Particularly, since the cover formed on the outer circumferential surface of the valve body is elastically deformable, it is possible to quickly exhaust the gas and reliably block inflow of external air.

Moreover, in the present exemplary embodiment, since the vent cap has a simple structure including the body, the insert, and the valve, it is possible to obtain has a small possibility of breakdown and a reliable operation, and reduce a production cost. In addition, since the body and the insert are coupled to each other through the coupling groove and the coupling protrusion and the insert and the valve are coupled to each other through the coupling hole and the fixing protrusion, it is possible to easily assemble constituent elements and obtain strong coupling strength of the constituent elements.

DETAILED DESCRIPTION OF THE EMBODIMENTS

Figure 1:
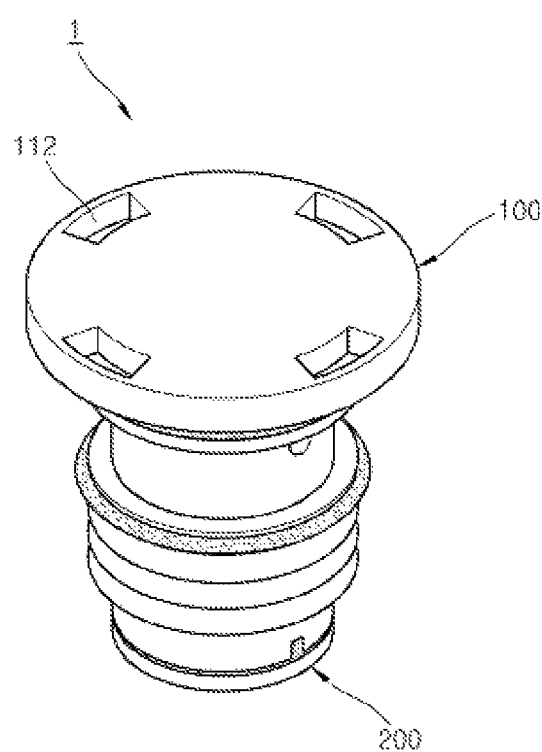
FIG. 1 is a perspective view showing a storage-battery vent cap in accordance with an exemplary embodiment of the present invention.

An exemplary embodiment of the present invention will be described in detail with reference to the accompanying drawings. In assigning reference numerals to respective constituent elements in the drawings, the same reference numerals designate the same constituent elements although the constituent elements are shown in different drawings.

In accordance with an exemplary embodiment of the present invention, a storage-battery vent cap (hereinafter, simply referred to as vent cap) 1 is a device installed in a vent hole 510 of a storage battery 500 to adjust an internal pressure of the storage battery 500 by exhausting a gas generated inside the storage battery 500 and by blocking inflow of external air (see FIG. 5)

Figure 2:
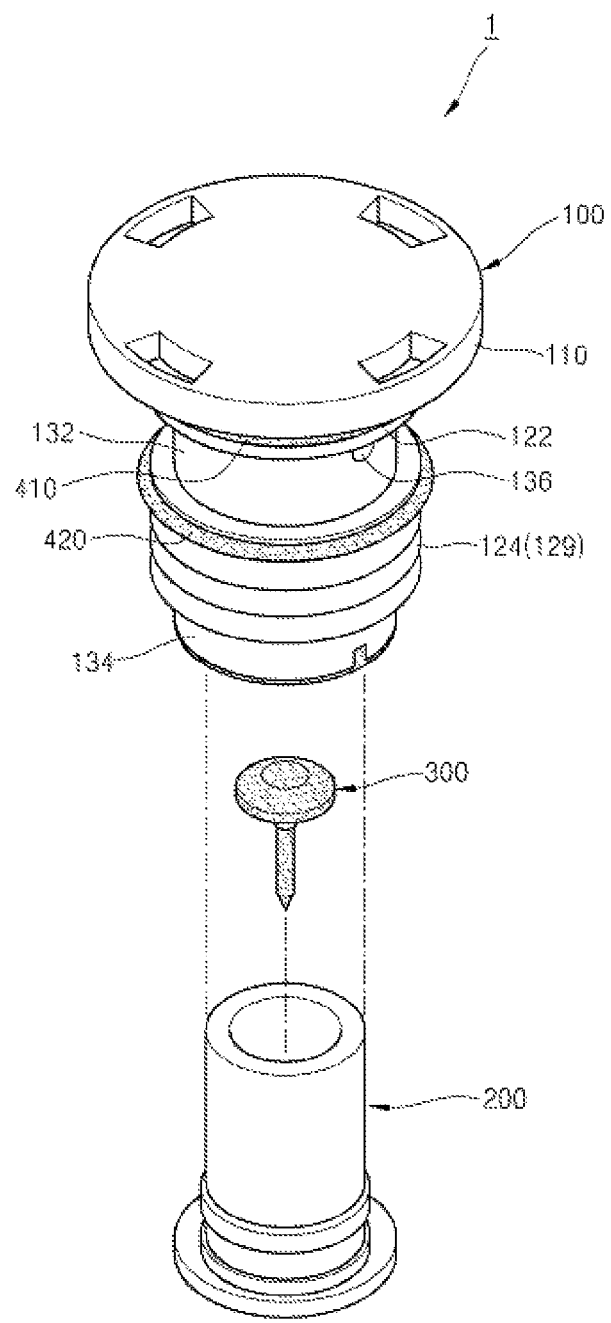
FIG. 2 is an exploded perspective view showing the vent cap in accordance with the present exemplary embodiment.

As shown in FIG. 1 and FIG. 2, the vent cap 1 includes a body 100, an insert 200 installed inside the body 100, and a valve 300 fixed to the insert 200. The vent cap 1 having such a structure has a small possibility of breakdown and a reliable operation since the structure thereof is simple. Further, the vent cap 1 is easy to manufacture and assemble, thereby reducing a production cost thereof.

Constituent elements 100 to 300 of the vent cap 1 having the aforementioned objects and effects will be described below.

Figure 4:
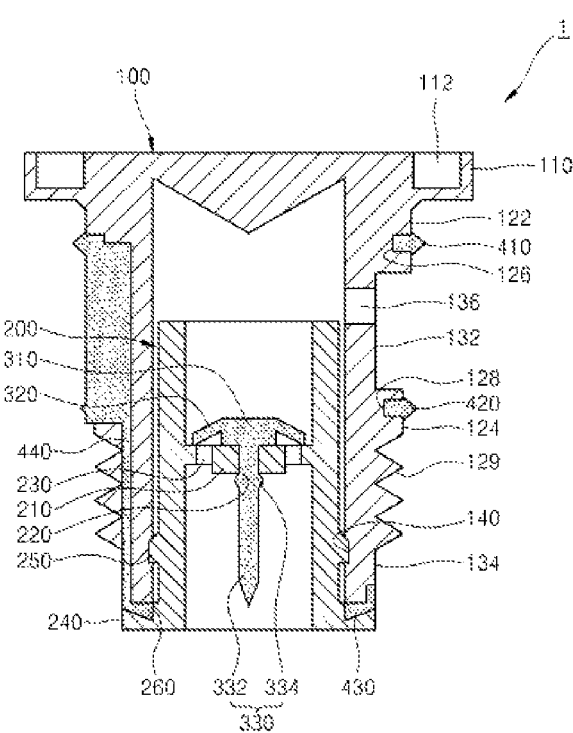
FIG. 4 is a cross-sectional view showing the vent cap in accordance with the present exemplary embodiment.

Referring to FIG. 2 and FIG. 4, the body 100 is formed to have a hollow cylindrical shape with a circular cross section. An upper portion of the body 100 is sealed, and a flange 110 is provided at the circumference of a sealed upper end of the body 100.

Figure 5:
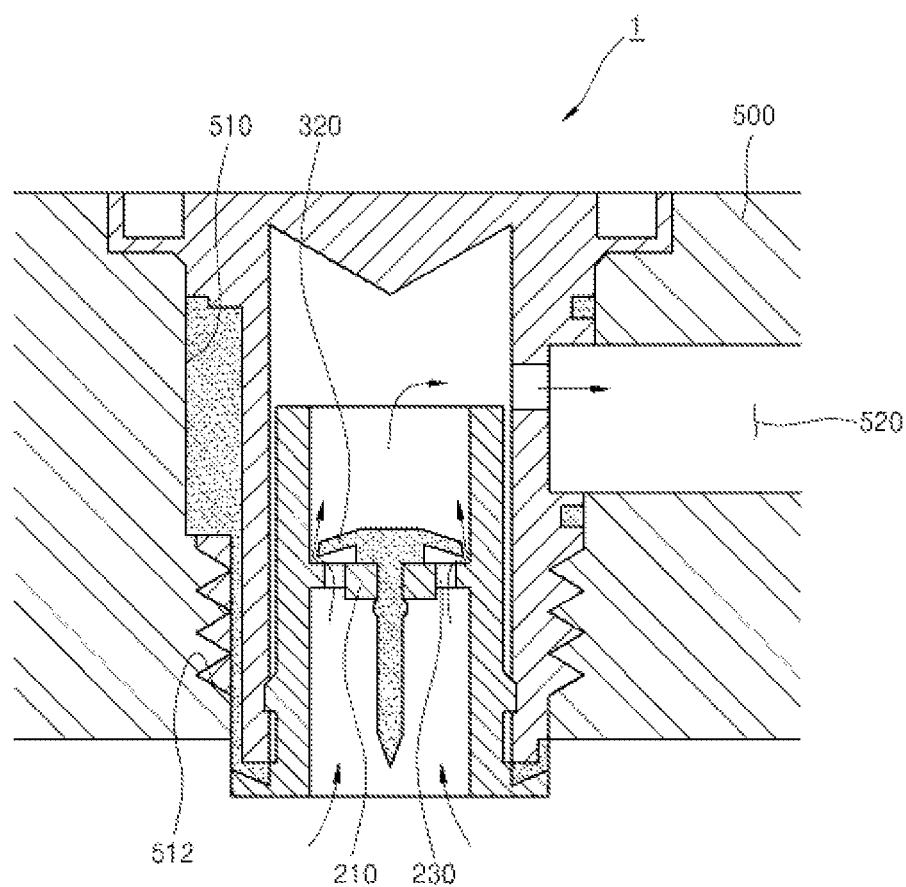
FIG. 5 shows an operational state of the vent cap in accordance with the present exemplary embodiment.

The flange 110 serves as a stopper for preventing the vent cap 1 from being inserted over a predetermined depth when the vent cap 1 is installed in the vent hole 510 of the storage battery 500 (see FIG. 5). The flange 110 is formed of a circular plate having a predetermined thickness and has a greater diameter than that of the body 100. A tool groove 112 is formed on a top surface of the flange 110 to install the vent cap 1 in the storage battery 500 or disconnect the vent cap 1 from the storage battery 500 by using a predetermined tool.

Except for the flange 110, the body 100 is formed to have a multi-step spool shape with large diameter portions 122 and 124 and small diameter portions 132 and 134. The large diameter portions 122 and 124 are respectively located at an upper end and a middle end of the body 100, and the small diameter portions 132 and 134 are respectively located between the pair of large diameter portions 122 and 124 and at a lower end of the body 100.

The large diameter portions 122 and 124 are adhered to an inner circumferential surface of the vent hole 510 when the vent cap 1 is installed. Installing grooves 126 and 128 are respectively formed at the pair of large diameter portions 122 and 124, and O-rings 410 and 420 are respectively inserted into the mounting grooves 126 and 128. A male screw 129 is formed on an outer circumferential surface of the large diameter portion 124 located at the middle end of the body 100. In this case, the O-rings 410 and 420 serve to seal a space between the body 100 and the vent hole 510 to thereby prevent exhaust of an internal gas and inflow of external air when the vent cap 1 is installed. The male screw 129 engages with a female screw 512 formed in the vent hole 510 to facilitate screw-connection when the vent cap is installed.

An exhaust hole 136 connected to the inside of the body 100 is formed in the small diameter portion 132 (located at an upper side) of the pair of the small diameter portions 132 and 134. When the vent cap 1 is installed, the small diameter portion 132 in which the exhaust hole 136 is installed is located to correspond to a discharge hole 520 of the storage battery 500 (see FIG. 5). Accordingly, a gas exhausted through the exhaust hole 136 is exhausted to the outside through the discharge hole 520.

As shown in FIG. 4, a coupling groove 140 is formed at a lower inner circumference of the body 100. In cooperation with a coupling protrusion 250 to be described later, the coupling groove 140 serves to connect the body 100 with the insert 200. By using the coupling groove 140 and the coupling protrusion 250, the body 100 and the insert 200 can be coupled to each other in a one-touch method in such a way so as to facilitate easy coupling but difficult disconnection.

Figure 3:
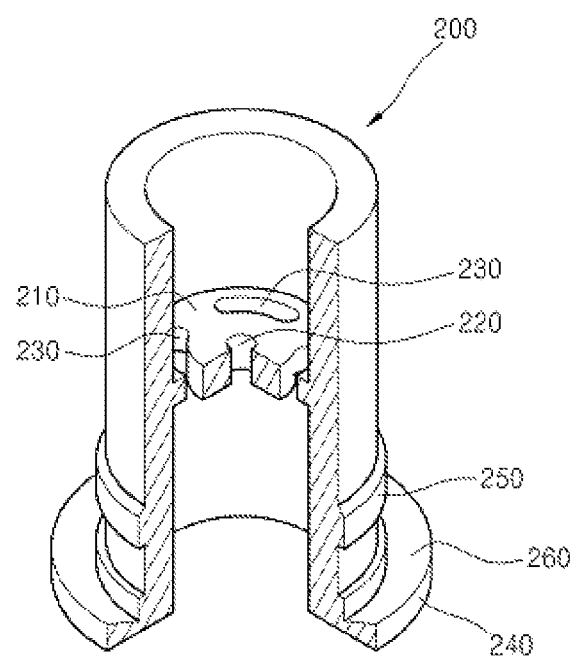
FIG. 3 is a partially cut-away perspective view showing an insert of the vent cap in accordance with the present exemplary embodiment.

As shown in FIG. 2 to FIG. 4, the insert 200 is formed to have a hollow cylindrical shape with a circular cross section. The insert 200 has a top end and a bottom end which are open, and a partition 210 is formed at a middle inner circumferential surface to divide an inner space of the insert 200 into two spaces. In the partition 210, a coupling hole 220 at which a valve 300 is installed and an air vent 230 through which a gas generated inside the storage battery 500 passes are formed. The coupling hole 220 is formed at a center of the partition 210, and the air vent 230 is formed around the coupling hole 220. For example, in the present exemplary embodiment, three air vents 230 are radially formed and disposed about the coupling hole 220. The air vent 230 has a slit shape extending in a circumferential direction about the coupling hole 220.

For the shape of the insert 200 described above, since the bottom end of the insert 200 has a completely open shape, the internal pressure of the insert 200 is maintained to be the same as that of the storage battery 500. In other words, when the internal pressure of the storage battery 500 is raised due to the gas generated inside the storage battery 500 and reaches a predetermined level, the internal pressure of the insert 200 is also increased identically to that of the storage battery 500. As a result, the valve 300 is reliably operated according to the internal pressure of the storage battery 500 to thereby quickly exhaust the gas and efficiently block inflow of external air.

A flange 240 is formed on a lower outer circumferential surface of the insert 200, and a packing 430 is interposed between a lower end of the body 100 and the flange 240. The packing 430 serves to prevent leakage of gas into a gap between the body 100 and the insert 200 and to block inflow of external air. When the insert 200 is coupled to the body 100, the packing 430 is compressed by the lower end of the insert 200 and the flange 240 to completely seal the gap between the body 100 and the insert 200. In this case, a mounting groove 260 into which a part of the packing 430 is to be inserted is formed on a top surface of the flange 240. The mounting groove 260 is formed to have a deeper depth toward the inside so as to prevent dislocation of the packing 430 when it is compressed.

The O-rings 410 and 420 are respectively injection-molded in the installing grooves 126 and 128, and the packing 430 is injection-molded at the lower end of the body 100. The O-rings 410 and the 420 and the packing 430 are connected to each other through a runner which is injection-molded at a groove formed at a side of the body 100.

A coupling protrusion 250 is formed at an upper portion of the flange 240 in the lower outer circumferential surface of the insert 200. In cooperation with the coupling groove 140, the coupling protrusion 250 serves to couple the body 100 to the insert 200. When the coupling groove 140 and the coupling protrusion 250 are used, the body 100 and the insert 200 can be coupled to each other in the one-touch method. This is because the upper portion of the coupling protrusion 250 has a taper shape which gets thinner toward the upper direction. In other words, the coupling protrusion 250 has a narrowed upper portion and a widened lower portion. Accordingly, it is possible to easily insert the insert 200 into the body 100 in a forwarding direction. However, since the widened lower portion of the coupling protrusion 250 is inserted into the coupling groove 140 and hooked by the coupling groove 140 in an backward direction, it is not easy to disconnect the insert 200 from the body 100. As a result, in the present exemplary embodiment, the vent cap 1 has some advantages in that it is easy to assemble the body 100 and the insert 200, while it is difficult to disconnect the constituent elements from each other because of strong coupling strength of the constituent elements.

The valve 300 has an umbrella-like shape and includes a valve body 310, a cover 320 formed on an outer circumferential surface of the valve body 310, and a fixing portion 330 protruded from a lower surface of the valve body 310. This valve 300 is made of a material having predetermined elasticity and serves to close the air vent 230 in a normal state and to open the air vent 230 when the internal pressure of the storage battery 500 is increased.

The valve 300 will be described in more detail with reference to FIG. 2 and FIG. 4. The valve body 310 of the valve 300 is formed of a circular plate having a diameter which is larger than that of the coupling hole 220. The cover 320 is formed to have a conical-hat shape which is unfolded downwardly from an upper outer circumferential surface of the valve body 310. A lower end of the cover 320 is formed to have a diameter in such a way so as to cover all the air vents 230 formed at a circumference of the coupling hole 220

The fixing portion 330 includes a fixing pin 332 protruded from a bottom surface of the valve body 310 and a fixing protrusion 334 formed in a middle end of the fixing pin 332.

In the valve 300 having the aforementioned structure and installed into the coupling hole 220, the valve body 310 and the fixing protrusion 334 are respectively adhered to a top surface and a bottom surface of the partition 210. As a result, since the valve body 310 and the fixing protrusion 334 have diameters which are larger than that of the coupling hole 220, the valve 300 can be reliably fixed to the partition 210

Particularly, the valve 300 is made of an elastic material. Accordingly, when the fixing pin 332 inserted into the coupling hole 220 is pulled, the diameter of the fixing protrusion 334 is reduced. This can make it easy to install the valve 300.

The vent cap 1 having the aforementioned structure is not operated when the internal pressure of the storage battery 500 is equal to or smaller than an appropriate level (e.g., 7 kPa). That is, the cover 320 of the valve 300 is adhered to the top surface of the partition 210 so as to close the air vent 230 as shown in FIG. 4. Accordingly, the gas generated inside the storage battery 500 is not exhausted to the outside, and inflow of external air is blocked.

In contrast, when electrolyte solution is electrolyzed to generate hydrogen gas and oxygen gas, and thus the internal pressure of the storage battery 500 is increased and exceeds the appropriate level, e.g., 7 kPa, the cover 320 adhered to the top surface of the partition 210 is upwardly moved (elastically deformed) to open the air vent 230. Accordingly, the gas that is inside the storage battery 500 is exhausted to the outside so as to adjust the internal pressure of the storage battery 500 (see FIG. 5). In this case, the appropriate pressure at which the air vent 230 is opened by moving upwardly the cover 320 preferably ranges from 7 to 18 kPa.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. Accordingly, it will be appreciated by any person of ordinary skill in the art that a large number of modifications, permutations and additions are possible within the principles and spirit of the invention, the scope of which shall be defined by the appended claims and their equivalents.

What is claimed is:

1. A storage-battery vent cap comprising:
   a cylindrical body installed in a vent hole of a storage battery and formed with an exhaust hole;
   a cylindrical insert coupled to the body, a partition being formed inside the insert and a coupling hole and an air vent being formed in the partition; and
   a valve fixed to the coupling hole and elastically deformed by an internal pressure of the storage battery to open the air vent;
   wherein the body has a cylindrical shape having a sealed upper end, and the exhaust hole is formed on a side surface of the body, and the insert is inserted through an open lower end of the body, and a flange is formed on a lower outer circumferential surface of the insert;
   wherein a coupling protrusion is formed on the outer circumferential surface of the insert, and a coupling groove into which the coupling protrusion is to be inserted is formed an outer circumference of the body; and
   wherein a packing is interposed between a lower end of the body and the flange, and the packing is compressed when the body and the insert are coupled to each other.

2. The vent cap of claim 1, wherein the valve has an umbrella-like shape formed with a cover formed on an outer circumferential surface thereof, and
   the cover is elastically deformed according to the internal pressure of the cover to open the air vent.

3. The vent cap of claim 2, wherein the valve has a diameter which is larger than that of the coupling hole and includes a valve body having an outer circumferential surface on which the cover is formed and a fixing portion downwardly protruded from the valve body, and the valve body and the fixing portion are respectively adhered to a top surface and a bottom surface of the partition to fix the valve to the insert.

4. The vent cap of claim 3, wherein the fixing portion includes a fixing pin protruded from the valve body to extend through the coupling hole and a fixing protrusion formed in the fixing pin, and the valve body and the fixing protrusion are respectively adhered to the top surface and the bottom surface of the partition to fix the valve to the insert.

5. The vent cap of claim 1, wherein the coupling hole is formed at a center of the partition, and the air vent is formed around the coupling hole.

6. The vent cap of claim 5, wherein the air vent includes a plurality of air vents radially disposed about the coupling hole.

7. The vent cap of claim 6, wherein the air vent is a slit extending in a circumferential direction about the coupling hole.

8. The vent cap of claim 1, wherein a mounting groove into which a part of the packing is to be inserted is formed on a top surface of the flange, and the mounting groove has a shape of which depth gets deeper toward the inside.

9. The vent cap of claim 8, wherein an installing groove is formed at an upper end and a middle end of the body, and an O-ring is inserted into the installing groove.

* * * * *